United States Patent
Tsuchiya et al.

(10) Patent No.: US 7,966,587 B2
(45) Date of Patent: Jun. 21, 2011

(54) INFORMATION STORAGE MEDIUM ON WHICH IS STORED AN INTERCONNECTION PROGRAM, INTERCONNECTION METHOD, INTERCONNECTION APPARATUS, AND SEMICONDUCTOR DEVICE

(75) Inventors: Hideaki Tsuchiya, Kanagawa (JP); Shinji Yokogawa, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 834 days.

(21) Appl. No.: 11/798,981

(22) Filed: May 18, 2007

(65) Prior Publication Data
US 2008/0150168 A1    Jun. 26, 2008

(30) Foreign Application Priority Data
May 18, 2006    (JP) .................. 2006-138977

(51) Int. Cl.
*G06F 17/50* (2006.01)
(52) U.S. Cl. ........................................ 716/100
(58) Field of Classification Search ................ 716/1, 13, 716/100
See application file for complete search history.

(56) References Cited

U.S. PATENT DOCUMENTS

| | | | | |
|---|---|---|---|---|
| 6,038,383 | A * | 3/2000 | Young et al. ...................... | 716/5 |
| 2004/0221217 | A1 * | 11/2004 | Sato et al. ...................... | 714/745 |
| 2009/0013290 | A1 * | 1/2009 | Keinert et al. ................... | 716/4 |
| 2009/0024969 | A1 * | 1/2009 | Chandra ........................... | 716/5 |
| 2009/0119411 | A1 * | 5/2009 | Rutherford et al. ........... | 709/233 |

FOREIGN PATENT DOCUMENTS

| | | |
|---|---|---|
| JP | 2000-163460 | 6/2000 |
| JP | 2001-308156 | 11/2001 |
| JP | 2005-346527 | 12/2005 |

OTHER PUBLICATIONS

William R. Hunter, "Self-Consistent Solutions for Allowed Interconnect Current Density—Part I: Implications for Technology Evolution", Feb. 1997, pp. 304-309; IEEE Transactions on Electron Devices, vol. 44, No. 2; 0018-9383/97.

Ting-Yen Chiang et al., "Impact of Joule Heating on Scaling of Deep Sub-Micron Cu/low-k Interconnects", 2002, 2 pages, Symposium on VLSI Technology Digest of Technical Papers, Department of Electrical Engineering, Stanford University.

* cited by examiner

*Primary Examiner* — Jack Chiang
*Assistant Examiner* — Suchin Parihar
(74) *Attorney, Agent, or Firm* — Young & Thompson (57) ABSTRACT

Conventionally, an excessively strict current limitation is often adopted. An interconnection apparatus includes an acquisition unit and a decision unit. The acquisition unit serves to acquire a current density and data rate of a region that a specific interconnect passes through. The decision unit serves to decide whether the temperature increase corresponding to the current density and the data rate acquired by the acquisition unit is within a permissible range.

12 Claims, 12 Drawing Sheets

INFORMATION STORAGE MEDIUM ON WHICH IS STORED AN INTERCONNECTION PROGRAM, INTERCONNECTION METHOD, INTERCONNECTION APPARATUS, AND SEMICONDUCTOR DEVICE

This application is based on Japanese patent application No. 2006-138977, the content of which is incorporated hereinto by reference.

BACKGROUND

1. Technical Field

The present invention relates to an information storage medium on which is stored an interconnection program, an interconnection method, an interconnection apparatus, and a semiconductor device.

2. Related Art

When a current runs through a metal interconnect in an LSI, Joule heating always takes place because of collision of a conduction electron with a crystal lattice. The Joule heating increases the interconnect temperature, thereby increasing the resistance or accelerating electromigration. Accordingly, precise prediction of the life span of the LSI can only be made by accurately estimating the interconnect temperature taking the Joule heating into consideration. In order to assure the reliability of the LSI, it is essential to establish a model of the interconnect temperature increase due to the Joule heating, to thereby determine an appropriate limitation of the current with respect to the temperature increase.

For example, JP-A No. 2000-163460 discloses an interconnection method including calculating a current amount based on the load capacitance of the interconnect itself and the delay time of a cell, thereby evaluating the reliability. This document states that such method is also applicable to permissible current density, which is determined based on the criterion for limiting the heating value. Thus, the method determines a certain permissible current density, to thereby examine whether "current amount<interconnect width×permissible current density" is satisfied.

Meanwhile, the copper interconnect currently in popular use is generally manufactured through a Damascene process. This is a process including forming by etching a trench on an interlayer dielectric deposited in advance; depositing by physical vapor deposition a barrier metal for suppressing the diffusion of copper and a seed layer (Cu); and filling the trench with copper by plating or the like and grinding off the excessive layer by chemical mechanical polishing (hereinafter, CMP), thus forming the interconnect. To achieve sufficient flatness of the interconnect layer, it is necessary to evenly allocate the data rate, so that the interconnect layer can be uniformly ground in the wafer plane by the CMP process. For this purpose, generally a dummy interconnect, which is electrically isolated, is provided to thereby make the data rate as uniform as possible.

In addition to JP-A No. 2000-163460, the prior art related to the present invention includes JP-A No. 2005-346527, JP-A No. 2001-308156, and non-patent documents cited below.

[Patent document 1] JP-A No. 2000-163460
[Patent document 2] JP-A No. 2005-346527
[Patent document 3] JP-A No. 2001-308156
[Non-patent document 1] W. R. Hunter, "Self-Consistent Solutions for Allowed Interconnect Current Density—Part I: Implications for Technology Evolution", IEEE TRANSACTIONS ON ELECTRON DEVICES, Vol. 44, No. 2, February 1997, pp. 304-309.
[Non-patent document 2] Ting-Yen Chiang et al., "Impact of Joule Heating on Scaling of Deep Sub-Micron Cu/low-k Interconnects", 2002 Symposium on VLSI Technology Digest of Technical Papers, pp. 38-39.

The present inventors have recognized as follows. As stated above, in the typical interconnect based on the Damascene process, an interconnect involved in the Joule heating, i.e. an electrically active interconnect, and an interconnect not involved in the Joule heating, i.e. an electrically inactive interconnect, are mixedly laid out. Conventionally, however, the influence of the difference between the active and the inactive interconnects or the difference in data rate, which may act on the Joule heating, has not been taken into consideration. Therefore, a worst case, specifically the case where the electrically activated interconnect is most densely arranged, has to be assumed, which could lead to an excessively strict current limitation.

SUMMARY

According to the present invention, there is provided an information storage medium on which is stored an interconnection program for causing a computer to execute: an acquisition step including acquiring a current density and a data rate of a region that a specific interconnect passes through; and a decision step including deciding, based on a relationship between a temperature increase of the specific interconnect, and the current density and the data rate, whether the temperature increase corresponding to the current density and the data rate acquired through the acquisition step is within a permissible range.

In the interconnection program thus arranged, it is decided whether the temperature increase is within a permissible range based on a relationship between a temperature increase of the specific interconnect, and the current density and the data rate. In other words, the fact that the interconnect temperature increase also depends on the data rate in addition to the current density is taken into consideration. Such program allows, therefore, adopting an optimal permissible current according to the actual data rate.

According to the present invention, there is provided an interconnection method comprising: acquiring a current density and a data rate of a region that a specific interconnect passes through; and deciding, based on a relationship between a temperature increase of the specific interconnect, and the current density and the data rate, whether the temperature increase corresponding to the current density and the data rate acquired through the acquisition step is within a permissible range.

In the interconnection method thus arranged, it is decided whether the temperature increase is within a permissible range based on a relationship between a temperature increase of the specific interconnect, and the current density and the data rate. In other words, the fact that the interconnect temperature increase also depends on the data rate in addition to the current density is taken into consideration. Such method allows, therefore, adopting an optimal permissible current according to the actual data rate.

According to the present invention, there is provided an interconnection apparatus comprising an acquisition unit that acquires a current density and a data rate of a region that a specific interconnect passes through, and a decision unit that decides, based on a relationship between a temperature increase of the specific interconnect, and the current density and the data rate, whether the temperature increase corresponding to the current density and the data rate acquired by the acquisition unit is within a permissible range.

The interconnection apparatus thus constructed decides whether the temperature increase is within a permissible range based on a relationship between a temperature increase of the specific interconnect, and the current density and the data rate. In other words, the fact that the interconnect temperature increase also depends on the data rate in addition to the current density is taken into consideration. Such apparatus allows, therefore, adopting an optimal permissible current according to the actual data rate.

According to the present invention, there is provided a semiconductor device, wherein a first data rate of an interconnect in a region along a route of an interconnect connected to a circuit that consumes a larger power is lower than a second data rate of an interconnect in another region.

Thus, the present invention provides an information storage medium on which an interconnection program is stored, an interconnection method, and an interconnection apparatus that allow adopting an optimal permissible current according to an actual data rate.

BRIEF DESCRIPTION OF THE DRAWINGS

The above and other objects, advantages and features of the present invention will be more apparent from the following description of certain preferred embodiments taken in conjunction with the accompanying drawings, in which:

FIGS. 3A and 3B are graphs showing power density dependence of interconnect temperature increase with respect to a plurality of data rate values. In FIG. 3B, the horizontal axis is standardized by the data rate for FIG. 3A;

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereunder, an exemplary embodiment of an information storage medium on which is stored an interconnection program, an interconnection method, and an interconnection apparatus according to the present invention will be described in details, referring to the accompanying drawings. In the drawings, same constituents are given the same numerals, and the description thereof will not be repeated.

First Embodiment

Figure 1:
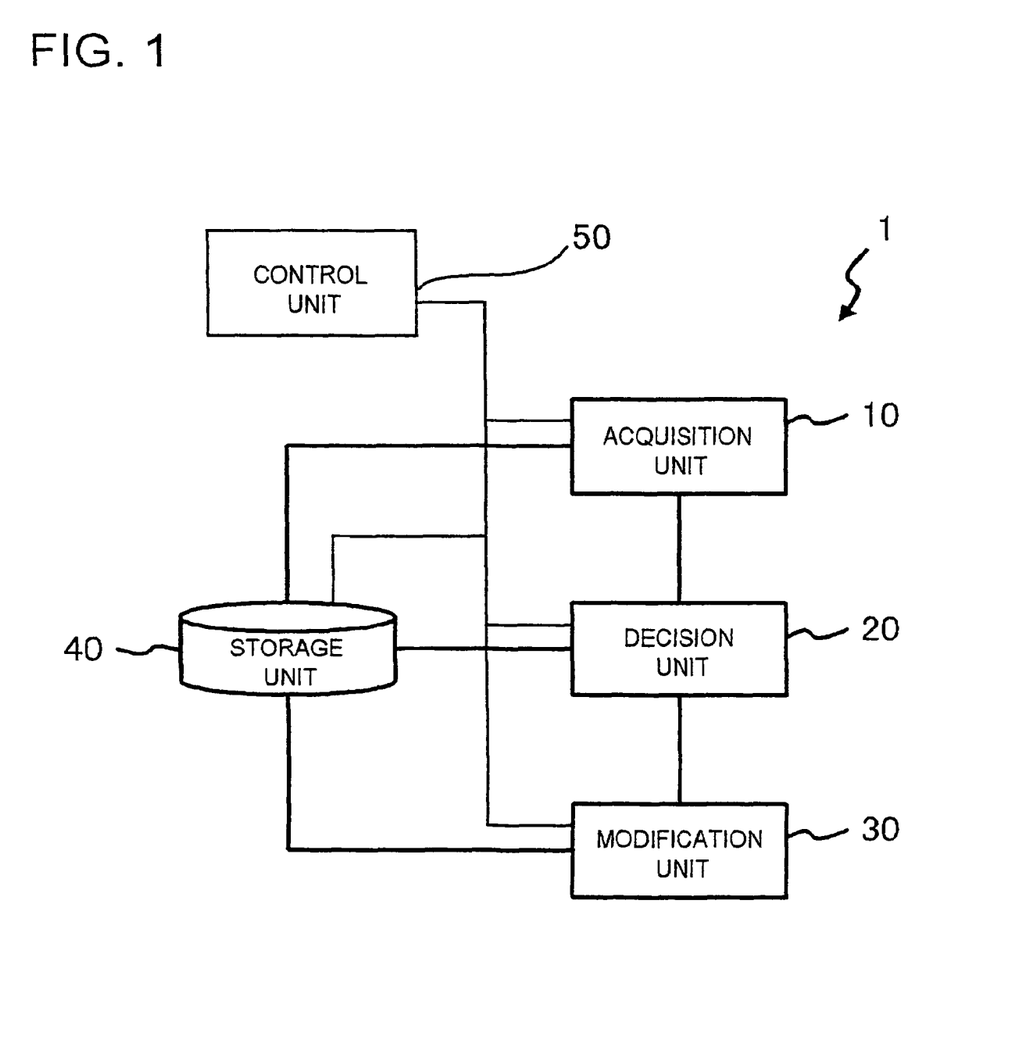
FIG. 1 is a block diagram showing an interconnection apparatus according to a first embodiment of the present invention.

FIG. 1 is a block diagram showing an interconnection apparatus according to a first embodiment of the present invention. The interconnection apparatus 1 includes an acquisition unit 10, a decision unit 20, and a modification unit 30. The acquisition unit 10 serves to acquire, under the control of a control unit 50, a current density and a data rate of a region that a specific interconnect (an interconnect being focused on) passes through. The current density and the data rate acquired by the acquisition unit 10 are stored in a storage unit 40, under the control of the control unit 50. The function of the acquisition unit 10 may be performed by, for example, a CPU. The function of the storage unit 40 may be performed by, for example, a memory such as a ROM or RAM. In addition, the function of the control unit 50 may be performed by a CPU.

The decision unit 20 serves to decide whether a temperature increase corresponding to the current density and the data rate acquired by the acquisition unit 10 is within a permissible range, under the control of the control unit 50. Such decision is made based on a relationship between the temperature increase, and the current density and the data rate of a specific interconnect. In this embodiment, the relationship is defined by the equation (1) given below:

$$I < w \times \{A \times \Delta T \times (1/D.R - 1)\}^{1/2} \quad (1)$$

How this equation is led will be described later. In this equation, I represents the amount of current running through the specific interconnect; w represents the width of the specific interconnect; $\Delta T$ represents an upper limit of the permissible range of the temperature increase of the specific interconnect; and D.R. represents the data rate. In addition, A is a constant. Thus in this embodiment, the decision whether the temperature increase is within the permissible range is made depending on whether the equation (1) is satisfied. The equation (1) is also stored in the storage unit 40. The function of the decision unit 20 can also be achieved by a CPU, as in the case of the acquisition unit 10.

The modification unit 30 serves to modify, under the control of the control unit 50, the layout of the interconnect group that includes the specific interconnect in the case where the decision unit 20 has output a negative decision. In this modification, it is preferable to modify another interconnect other than the specific interconnect in the interconnect group, thereby decreasing the data rate without modifying the specific interconnect. The modification methods may include, for example, modifying the position of another interconnect so as to expand the interval between such another interconnect and the specific interconnect, and deleting a part or the whole of a dummy interconnect in another interconnect. The function of the modification unit 30 can also be achieved, for example by a CPU.

Following is an example of the operation of the interconnection apparatus 1, given as an embodiment of the interconnection method according to the present invention. The interconnection method includes an acquisition step including acquiring a current density and a data rate of a region that a specific interconnect passes through, and a decision step including deciding, based on a relationship between a temperature increase of the specific interconnect, and the current density and the data rate, whether the temperature increase corresponding to the current density and the data rate acquired through the acquisition step is within a permissible range.

Such operation of the interconnection apparatus 1 is performed when the interconnection program causes a computer, namely the interconnection apparatus 1, to execute the acquisition step and the decision step. The interconnection program is stored in the storage unit 40. Here, the storage unit 40 does not have to be physically a single piece of memory, but may be constituted of two or more memories. For example, the storage unit 40 may include a RAM that stores therein the current density and the data rate acquired by the acquisition unit 10, and a ROM that stores therein the interconnection program and so forth.

Figure 2:
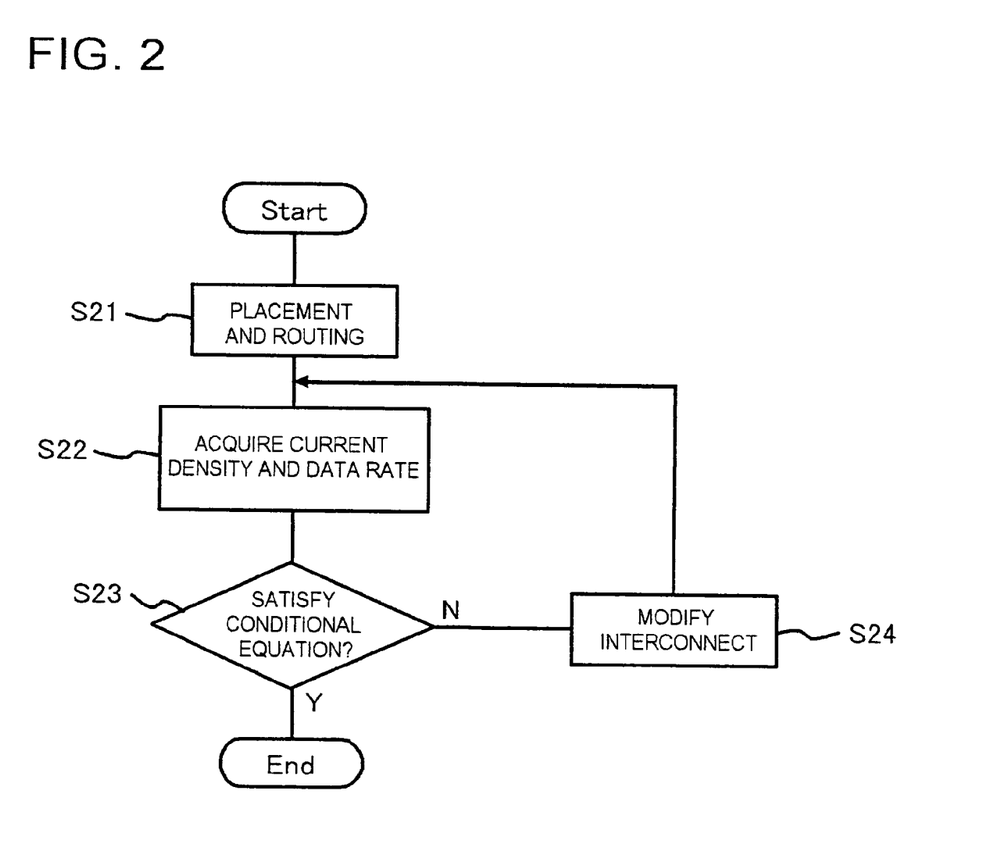
FIG. 2 is a flowchart for explaining an operation shown in FIG. 1.

Referring to FIG. 2, the operation of the interconnection apparatus 1 will be described in further details. Firstly, upon completion of placement and routing (S21), the region to be inspected is scanned, and the current density and the data rate are retrieved as information in each region scanned (S22). Specifically, the interconnect layer, in which the specific interconnect is formed, is divided into a plurality of regions, and the current density and the data rate are acquired with respect to each of the regions. Then, it is decided whether the current density and the data rate thus acquired satisfy a conditional equation determined based on a permissible temperature increase value, i.e. the equation (1) (S23). If the conditional equation is not satisfied, the interconnect layout is modified (S24), and the steps S22 and S23 are repeated with respect to the modified interconnect layout. If the equation (1) is satisfied at the step S23, the inspection is completed.

As is apparent, in this example the acquisition step is executed after the placement and routing of the specific interconnect. When the inspection on heating (steps S22, S23) is executed after the completion of the placement and routing, the interconnection apparatus 1 may be called a placement and routing inspection apparatus. Likewise, the interconnection method and the interconnection program may be called a placement and routing inspection method and a placement and routing inspection program, respectively.

The effects of this embodiment are explained below. In this embodiment, it is decided whether the temperature increase is within a permissible range based on a relationship between a temperature increase of the specific interconnect, and the current density and the data rate. In other words, the fact that the interconnect temperature increase also depends on the data rate in addition to the current density is taken into consideration. Such arrangement allows, therefore, adopting an optimal permissible current according to the actual data rate.

Figure 3A:
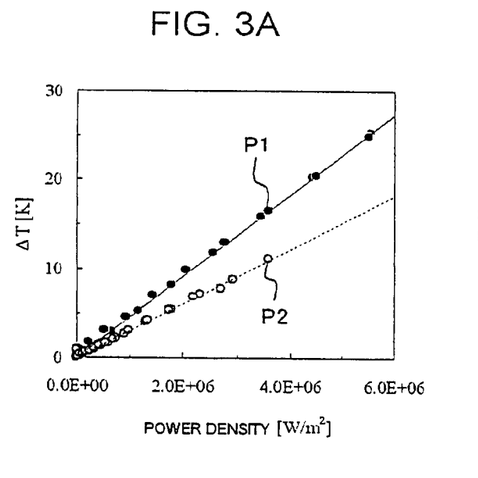
Figure 3B:
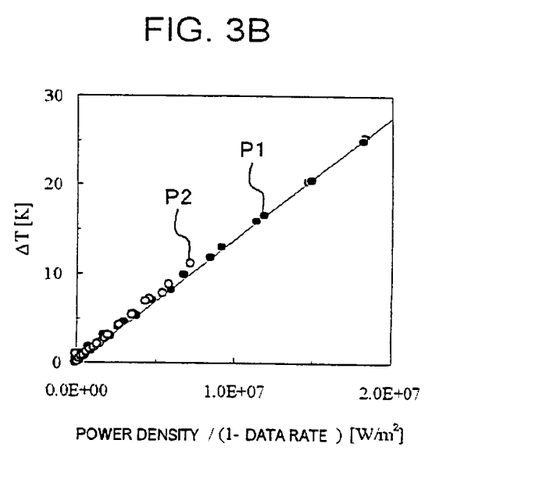

Referring now to FIGS. 3A and 3B, the dependence of the interconnect temperature increase on the current density and the data rate will be described. FIG. 3A is a graph showing a measurement result of the power density dependence of the interconnect temperature increase, with respect to a plurality of data rate values. The vertical axis represents the amount of increase of the interconnect temperature $\Delta T(K)$, and the horizontal axis represents the power density ($W/m^2$). Plots P1 in solid circles and plots P2 in white circles represent the data corresponding to the data rate of 70% and 50%, respectively. The difference in data rate was made by changing the size of the dummy interconnect.

In view of these graphs, it is understood that, under the same power density, the temperature increase is less when the data rate is lower. To be more detailed, when the volume occupied with the interconnect metal is smaller and the volume occupied with the interlayer dielectric is larger, heat dissipation in a lateral direction of the interconnect becomes relatively small, and hence the interconnect temperature becomes less apt to increase.

In FIG. 3B, the horizontal axis of FIG. 3A is standardized by the data rate. In other words, the horizontal axis represents the value given by dividing the power density by (1−data rate). In FIG. 3B, the data corresponding to the data rate of 70% and 50% coincide with each other on a line. Thus, the interconnect temperature increase may be standardized by the two parameters, namely the power density and the data rate.

As described above, the interconnect temperature increase is determined by the density of the applied power and the data rate. In other words, an increase in resistance of the interconnect and acceleration of electromigration due to the Joule heating can be suppressed utilizing the three parameters, namely the current density, data rate, and permissible temperature increase.

As already stated, the temperature is less apt to increase when the data rate is lower. Accordingly, the lower the data rate is, the greater permissible current may be adopted. Thus, providing the lower data rate allows applying the greater amount of current, thereby achieving faster operation speed of the device. Also, when any of the interconnects does not satisfy the current limitation, i.e. does not satisfy the equation (1), lowering the data rate within the permissible range of the process leads to satisfaction of the limitation.

Also, in this embodiment, when the decision unit 20 outputs a negative decision, the modification unit 30 modifies the layout of the interconnect group that includes the specific interconnect. Providing thus the layout modification function to the interconnection apparatus 1 further upgrades the utility of the interconnection apparatus 1.

Regarding the modification referred to above, modifying another interconnect thereby lowering the date rate without modifying the specific interconnect leads to simpler and quicker execution of the intended modification, because such method eliminates the need to modify the specific interconnect. Especially deleting a part or the whole of the dummy interconnect thereby lowering the data rate makes the modification even simpler.

Further, the decision on whether the temperature increase is within the permissible range is made depending on whether the equation (1) is satisfied. Such arrangement allows making the decision easily and clearly.

Figure 4:
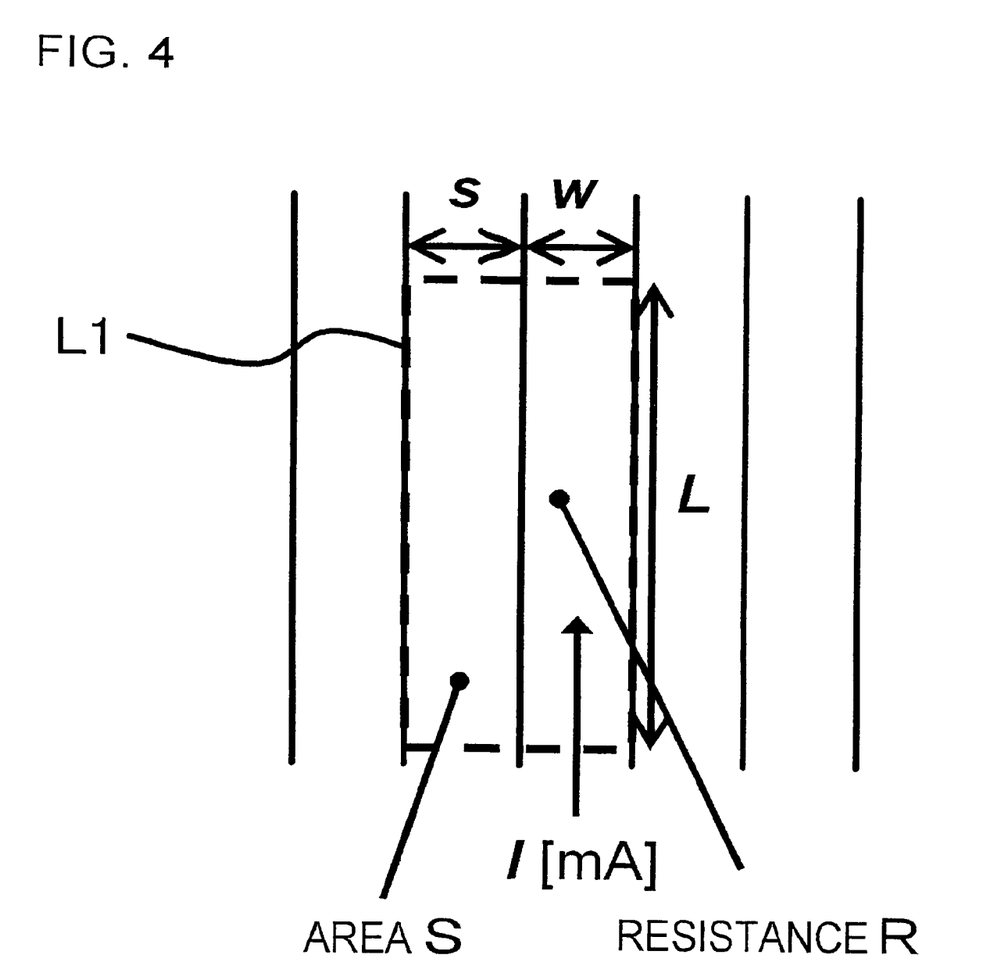
FIG. 4 is a plan view for explaining the process of derivation of a equation employed in a decision step.

The basis of the equation (1) will now be described, referring to FIG. 4. For the sake of explicitness, it will be assumed that a current I is running through an interconnect having a width w aligned at regular intervals s. Also, the interconnect will be assumed to have a sheet resistance of $\rho_s$ ($\Omega/\square$). Under such state, the following equation (2) can be established with respect to a region enclosed by a dot line L1 (width s+w, length L), based on the result shown in FIG. 3B:

$$\Delta T = Const. \times I^2 \times \rho_s \times \frac{L}{w} \times \frac{1}{L \times (s+w)} \times \frac{1}{(1-D.R.)} \quad (2)$$

Whereas, D.R. may be substituted as follows:

$$D.R. = w/(s+w) \quad (3)$$

Thus, modifying the equation (2) utilizing the equation (3) leads to the foregoing equation (1).

Here, the equation (3) is established when the interconnect is assumed to be aligned at regular intervals. In general cases, the following equation led by modifying the equation (2) is established:

$$I < \{A \times (S/R) \times \Delta T \times (1/D.R. - 1)\}^{1/2} \quad (4)$$

wherein S represents the sectional area of a space between the interconnects, R represents the resistance of the interconnect.

Meanwhile, the interconnect temperature increase is determined comprehensively by a plurality of factors such as the current running through the interconnect, the interconnect resistance, and heat dissipation performance. When designing the LSI in general, two factors can be controlled. One is the current to be applied to the interconnect, and the other is the interconnect resistance, i.e. the layout such as the interconnect width and the interconnect length. Since the latter largely affects the circuit location and signal delay in the LSI designing, a certain degree of freedom has to be secured except for a portion including the power source or the like. Conventionally, therefore, it has been a common practice to limit the former factor i.e. the current, assuming a worst case of the placement and routing where the temperature increase becomes largest, to thereby execute the inspection and modification, as stated earlier. However, the actual outcome of the placement and routing usually does not show the worst case, and hence, as a result, the current limitation could be an excessive restriction on the designing. This may lead to an increase in chip area.

Figure 7:
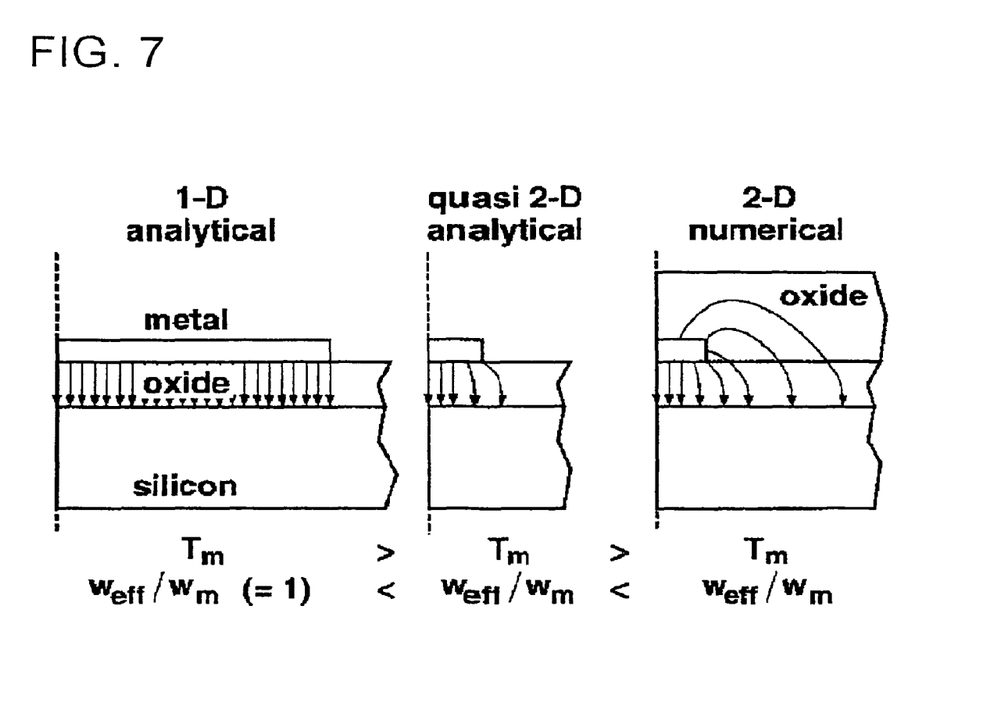
FIG. 7 includes cross-sectional views for explaining that the 1-D model is a worst case in the non-patent document 1.

Various proposals have been made on the concept of the worst case. For example, the non-patent document 1 proposes 1-D model representing a most extreme case of the temperature increase of a single interconnect. FIG. 7 includes cross-sectional views for explaining that the 1-D model is the worst case. Arrows in FIG. 7 indicate the routes via which the heat generated by the Joule heating diffuses toward a silicon substrate.

Actually, in addition to the heat dissipation route from the interconnect to the silicon substrate right thereunder, a heat dissipation route radially extending from an edge portion of the interconnect, as well as a heat dissipation route from an upper portion of the interconnect exist. Such routes are shown as 2-D numerical model, and results of theoretical calculation on the interconnect temperature increase based on this model generally agree with practical measurements.

Next, quasi 2-D analytical model is one in which the heat dissipation from an upper portion of the interconnect may be disregarded from the viewpoint that the heat dissipation to the upper portion of the interconnect is low in amount. This model only takes into consideration the radial heat dissipation route from an edge portion of the interconnect. Accordingly, for the result of theoretical calculation based on the quasi 2-D analytical model, a slightly greater temperature increase is estimated, compared with the 2-D numerical model.

Further, disregarding the radial heat dissipation route from the edge portion of the interconnect leads to a 1-D analytical model. In this case, only the heat dissipation toward the silicon substrate right under the interconnect is taken into consideration. Thus, for the result of theoretical calculation, a greater increase in temperature than the actual case is estimated. Based on the foregoing, the non-patent document 1 proposes to employ the 1-D analytical model as the worst case.

The worst case proposed in the non-patent document 1 is, however, based on an isolated single interconnect, and does not reflect a mutual effect between densely arranged interconnects. Thus, the non-patent document 2 takes the actual layout into consideration and points out that the temperature increase is incurred in different manners in a dense interconnect and an isolated interconnect.

Figure 8A:
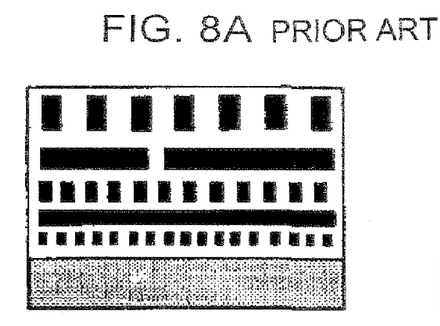
FIGS. 8A to 8C are cross-sectional views for explaining a heat dissipation model disclosed in the non-patent document 2.
Figure 8B:
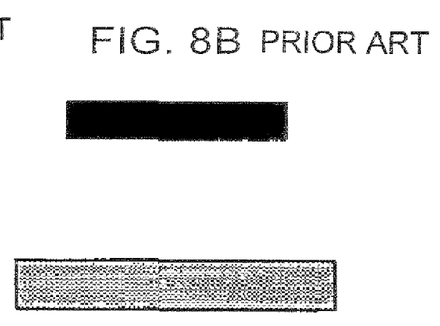
Figure 8C:
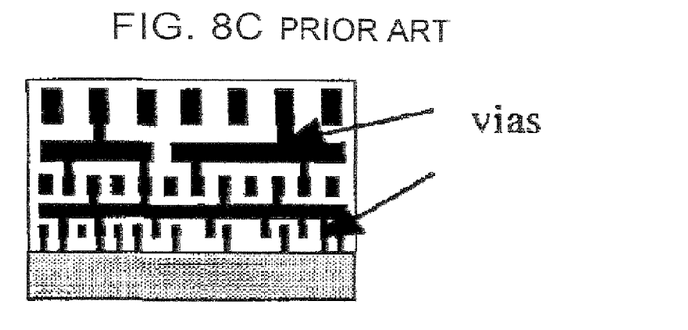
Figure 9:
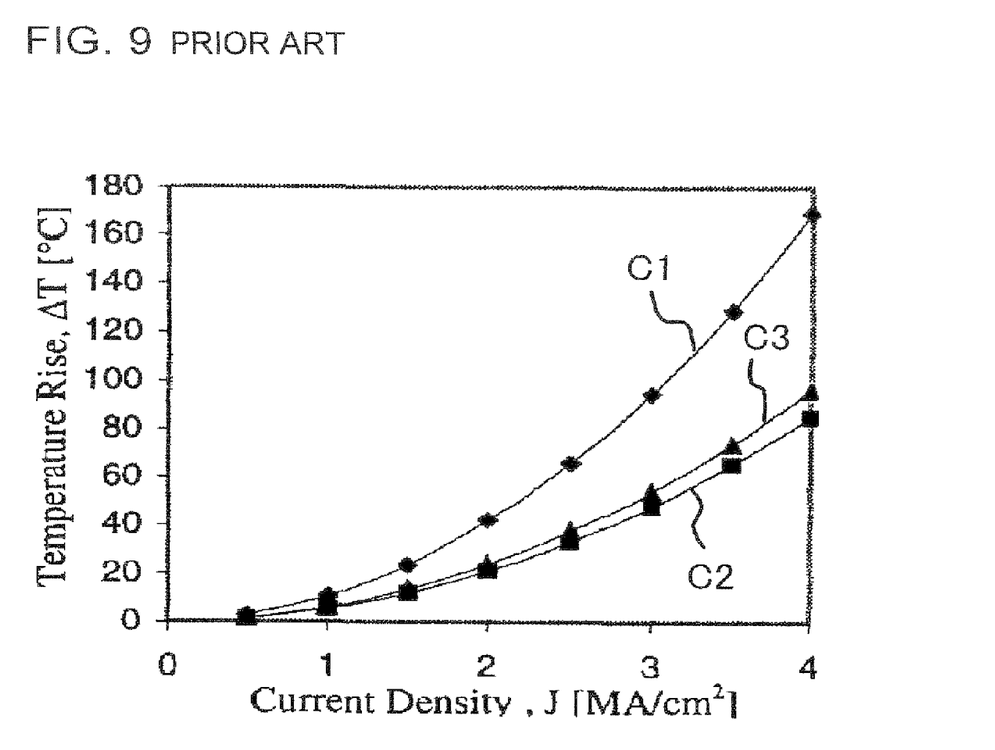
FIG. 9 is a graph showing a relationship between the current density and the temperature increase in the heat dissipation models shown in FIGS. 8A to 8C.

FIGS. 8A to 8C are cross-sectional views for explaining the heat dissipation models disclosed in the non-patent document 2. FIG. 9 is a graph showing a relationship between the current density and the temperature increase in the heat dissipation models shown in FIGS. 8A to 8C. Curves C1, C2, and C3 in the graph correspond to the heat dissipation models shown in FIGS. 8A, 8B, and 8C, respectively. The 1-D analytical model in the non-patent document 1 corresponds to FIG. 8B. FIG. 8A shows a model representing a dense interconnect to which a current of the same density is being applied. In comparison with FIG. 8B, the temperature increase in the model of FIG. 8A becomes greater. Accordingly, the model of FIG. 8B does not represent the worst case. Thus, the non-patent document 2 declares that the density of the interconnect has to be taken into consideration.

Figure 10:
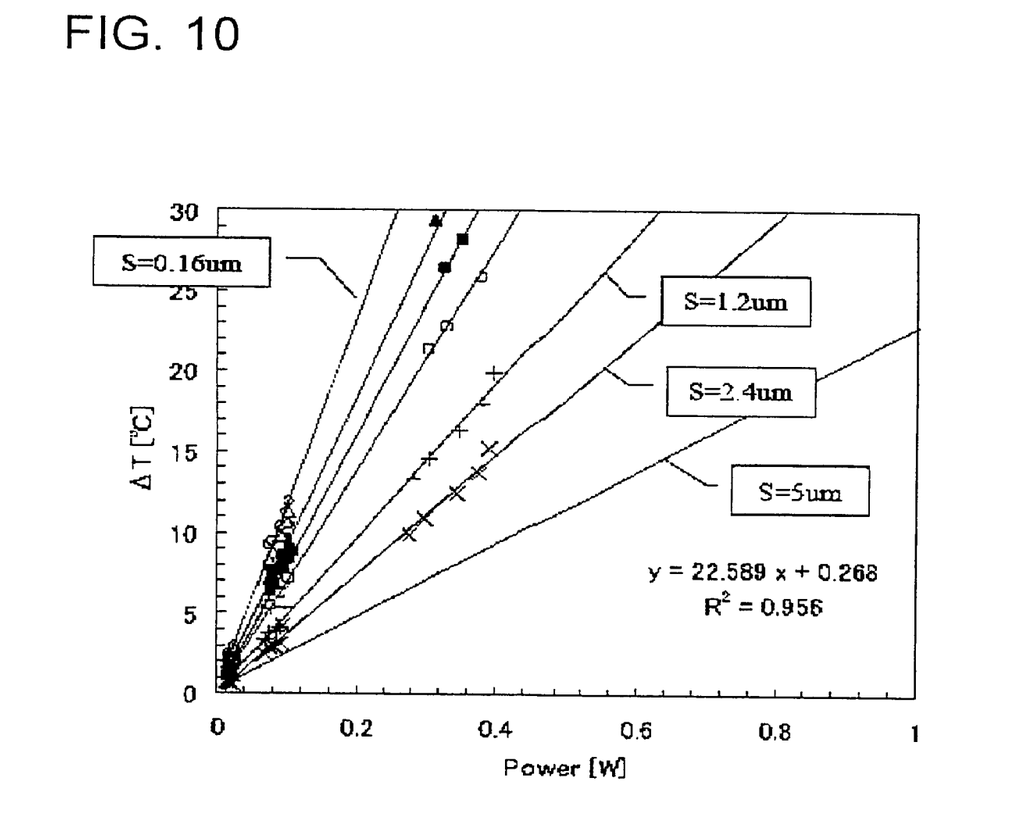
FIG. 10 is a graph showing results of quantitative inspection of the temperature increase depending on the density of the interconnect.

In this relation, the patent document 3 proposes bending back a single interconnect thereby aligning the interconnect in a plurality of rows, thus promoting the Joule heating efficiency. This shows that, in the case where the interconnect of the same current density is densely aligned, the Joule heating incurs a greater temperature increase. Now, FIG. 10 shows results of more quantitative inspection of the temperature increase depending on the density of the interconnect. In the graph shown in FIG. 10, the interconnect temperature increases under different power supply are plotted, with respect to different interconnect intervals (S) defined by a serpentine interconnect pattern. The graph proves that the narrower the interconnect interval is, the greater temperature increase is incurred.

The model of FIG. 8A is, however, not regarded as the worst case in the non-patent document 2. According to the document, it is because, in the case where the interconnect being focused on is connected by a via to a lower-layer interconnect, the heat conduction through the via is not taken into consideration. The model of FIG. 8C corresponds to such a case. The calculations shown in FIG. 9 indicate that connection to a lower-layer interconnect through a via leads to a reduced temperature increase. In the non-patent document 2, such current limitation value that suppresses the interconnect temperature increase to a predetermined value or lower is calculated and indicated, based on the model of FIG. 8C.

Based on the foregoing, it is considered that the model that supposes the connection to the lower-layer interconnect through the via appropriately represents the worst case. Employing such worst case is, however, not practical guideline in modifying the placement and routing of the LSI interconnect.

First of all, in order to quantitatively determine the heat dissipation effect toward the lower-layer interconnect, the number of vias connecting the specific interconnect and the lower-layer interconnect, heat capacitance of the lower-layer interconnect to which the specific interconnect is connected (layout of the lower-layer interconnect to which the specific interconnect is connected), and density of the interconnect layer including the specific interconnect are employed as parameters. For example, when a current exceeding the limitation value calculated based on the model of FIG. 8C is to be applied to the layout after the placement and routing, the interconnect layout has to be first modified so as to satisfy the limitation value. Changing the interconnect width to thereby change the resistance itself affects the signal delay, because of the change in interconnect resistance. To increase the heat dissipation effect itself, it is necessary to provide an interconnect in the lower layer. Thus, such method has the drawback that the modification of the layout may involve the lower layer, in addition to the interconnect layer that includes the specific interconnect.

Figure 11A:
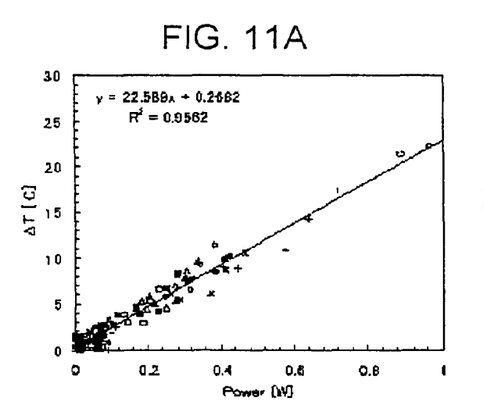
FIGS. 11A and 11B are graphs showing the interconnect temperature increase under different power supplies, the former with a $SiO_2$ interlayer film, and the latter with a low-k interlayer film.
Figure 11B:
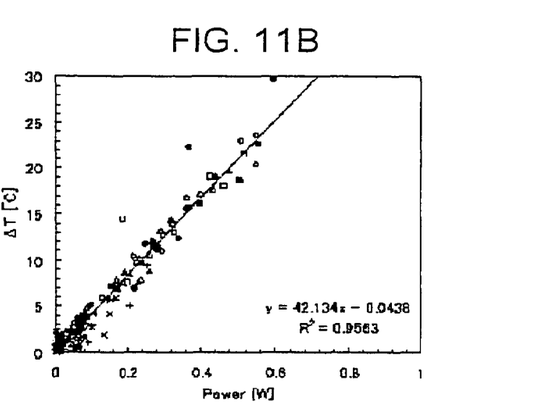

Besides, the foregoing tendency becomes more prominent when an interlayer film of a relatively low dielectric constant is employed as the interlayer dielectric. The non-patent document 2 provides temperature increase data with interlayer films of different dielectric constants, in which the lower the dielectric constant is, the greater temperature increase is incurred. FIG. 11A is a graph showing the interconnect temperature increase under different power supplies with a $SiO_2$ interlayer film, while FIG. 11B is a graph showing the interconnect temperature increase under different power supplies with a low dielectric constant (hereinafter, low-k) interlayer film. From the comparison of those graphs, it is understood that employing the low-k interlayer film incurs a greater temperature increase.

The foregoing drawback originates from neglecting the difference in interconnect density between the involved layers, in the model for predicting the interconnect temperature increase. In other words, disregarding the fact that the interconnect temperature differently increases depending on the data rate of the interconnect may lead to adopting an excessively optimistic limitation. Besides, a model that facilitates practically modifying the placement and routing is not provided.

Second Embodiment

Figure 5:
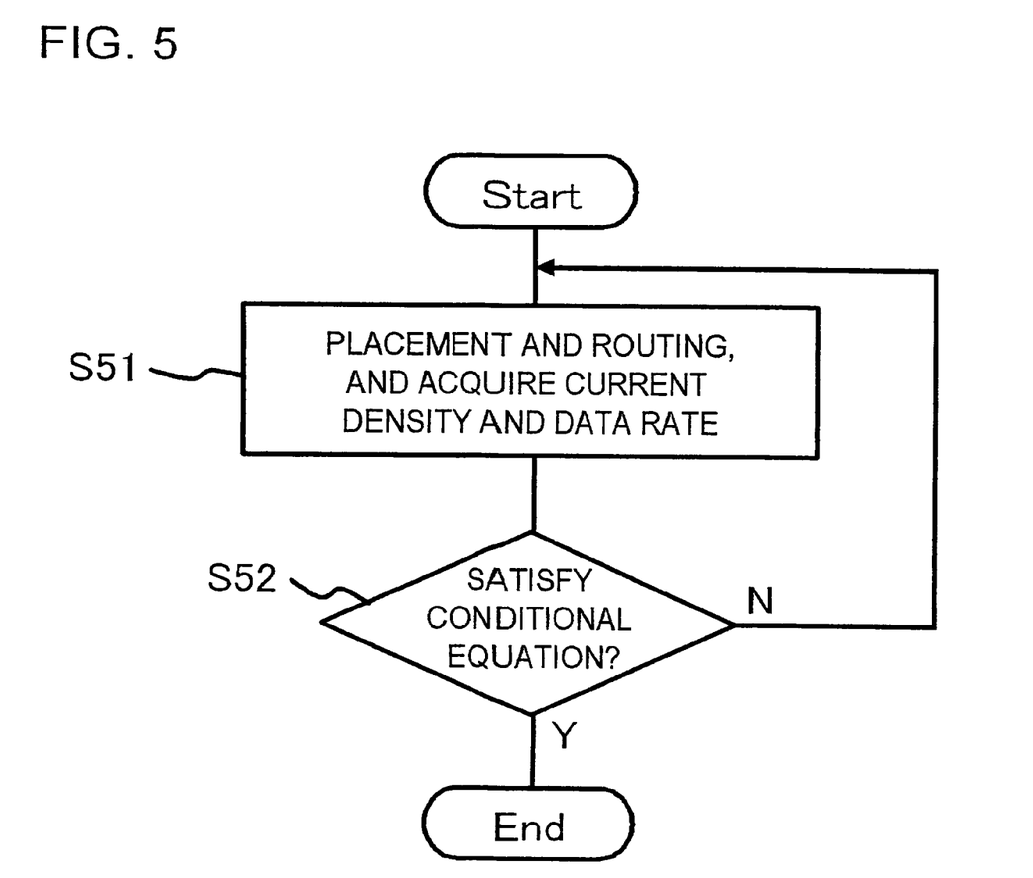
FIG. 5 is a flowchart for explaining an operation of an interconnection apparatus according to a second embodiment of the present invention.

FIG. 5 is a flowchart for explaining an operation of an interconnection apparatus according to a second embodiment of the present invention. In this embodiment, the structure of the interconnection apparatus is generally the same as that shown in FIG. 1. However, the arrangement of the interconnection program is different from the foregoing embodiment. Accordingly, the operation of the interconnection apparatus is also different from the foregoing embodiment.

Referring to FIG. 5, the operation of the interconnection apparatus according to this embodiment will be described. Firstly, upon completion of the placement and routing of the specific interconnect, the current density and the data rate of the region that the specific interconnect passes through are acquired (S51). Here, the acquisition of the current density and the data rate is performed, for example, through storing an experientially predictable current density and data rate as information in the storage unit 40 in advance, and retrieving such information from the storage unit 40. Then it is decided whether the current density and the data rate thus acquired satisfy the above equation (1) (S52). If the equation (1) is not satisfied, the steps S51 and S52 are repeated. In other words, modification of the position where the specific interconnect is to be placed or the like is performed, after which the decision is made again. If the equation (1) is satisfied at the step S52, the layout of the specific interconnect is completed.

In this embodiment, the influence on the temperature increase is estimated at the same time as the completion of the placement and routing, which eliminates the need to execute the modification after the completion of the placement and routing. Other advantageous effects of this embodiment are generally the same as those offered by the foregoing embodiment.

Third Embodiment

Figure 12:
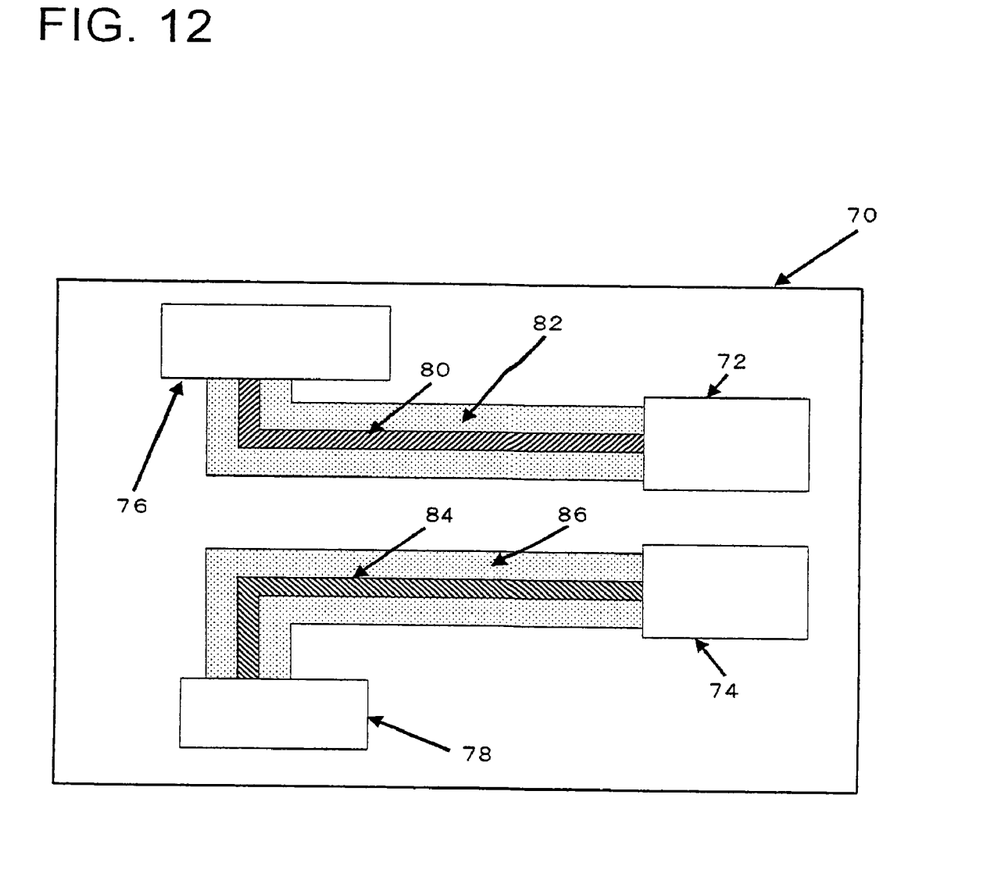
FIG. 12 is a schematic diagram showing an example of a semiconductor device designed based on the interconnection program of the present invention.

FIG. 12 depicts a semiconductor device 70 including an interconnect designed through the interconnection method according to the present invention. The semiconductor device 70 includes a circuit 72 that consumes a larger current, a circuit 74 that consumes a smaller current, a circuit block 76, and another circuit block 78. The circuit 72 which consumes a larger current is, for example, a clock driver or a clock tree. The circuit 72 which consumes a larger current is electrically connected to the circuit block 76 via an interconnect 80. The circuit 74 which consumes a smaller current is electrically connected to the circuit block 78 via an interconnect 84. Here, the remaining circuit blocks and interconnects are not shown. A region 82 along the interconnect route includes the interconnect 80 and its peripheral region, and a region 86 along the interconnect route includes the interconnect 84 and its peripheral region.

In the semiconductor device 70, the interconnect data rate of the region 82 along the interconnect route (first interconnect data rate) is smaller than the interconnect data rate of the region 86 along the interconnect route (second interconnect data rate). The difference in interconnect data rate may be defined based on a difference between the interconnect data rate of a dummy interconnect (not shown) provided in the region 82 along the interconnect route, and the interconnect data rate of a dummy interconnect (not shown) provided in the region 86 along the interconnect route.

Such configuration enables suppressing the temperature increase of the interconnect 80 connected to the circuit 72 which consumes a larger current, thereby securing comparable reliability on the interconnect 80 connected to the circuit 72 which consumes a larger current, with that on the interconnect 84 connected to the circuit 74 which consumes a smaller current.

The information storage medium on which is stored the interconnection program, the interconnection method, the interconnection apparatus, and the semiconductor device according to the present invention are not limited to the foregoing embodiments, but various modifications may be made. To cite a few examples, the interconnection apparatus according to the foregoing embodiment includes the modification unit so that the interconnection apparatus automatically executes the modification of the interconnect layout. However, it is not mandatory to provide the interconnection apparatus with the modification unit, and the interconnect layout may be manually modified.

Also, according to the above embodiments, the interconnect layout is to be modified when the decision unit outputs a negative result at the decision step. However, the modification may also be made when the result given at the decision step is affirmative. For example, the interconnect interval may be expanded within a range that satisfies the equation (1), to thereby achieve a more advantageous layout.

Further, according to the above embodiments, the decision at the decision step is made only based on the current density and the data rate of the interconnect layer that includes the specific interconnect (specific interconnect layer). However, the decision may be made based not only on the specific interconnect layer, but also on the current density and the data rate of another interconnect layer (especially the one adjacent to the specific interconnect layer).

Figure 6:
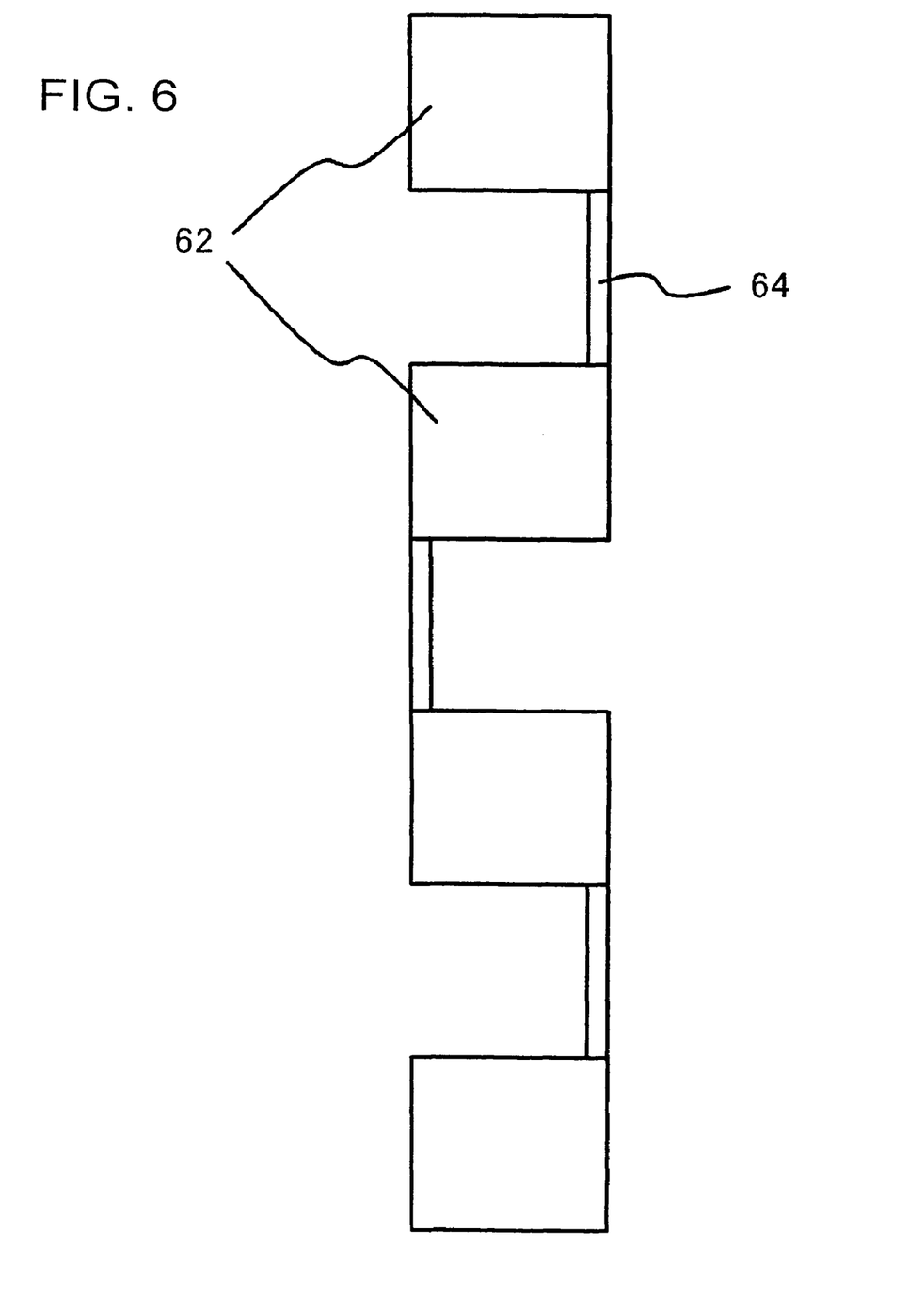
FIG. 6 is a plan view for explaining a variation of the embodiment.

Still further, the dummy interconnect may be utilized as a heat dissipation member. For example as shown in FIG. 6, a plurality of dummy interconnects 62 may be disposed such that the dummy interconnects 62 are connected via a conductor 64. The conductor 64 may be constituted of the same material as the dummy interconnects 62. Such configuration facilitates efficiently dissipating the heat generated in the activated interconnect, utilizing the route along the dummy interconnects 62. Also, the dummy interconnects may be connected to a heatsink, which further upgrades the heat dissipation performance by the dummy interconnects.

It is apparent that the present invention is not limited to the above embodiment, and may be modified and changed without departing from the scope and spirit of the invention.

What is claimed is:

1. A non-transitory information storage medium on which is stored an interconnection program for causing a computer to execute:
   an acquisition step including acquiring a current density and a data rate of a region that a specific interconnect passes through; and
   a decision step including deciding, based on a relationship between a temperature increase of said specific interconnect, and said current density and said data rate, whether said temperature increase corresponding to said current density and said data rate acquired through said acquisition step is within a permissible range.

2. The information storage medium on which is stored the interconnection program according to claim 1,
   wherein said acquisition step is executed after placement and routing of said specific interconnect.

3. The information storage medium on which is stored the interconnection program according to claim 2,
   wherein said acquisition step includes dividing said interconnect layer, in which said specific interconnect is formed, into a plurality of regions, and acquiring said current density and said data rate with respect to each of said regions.

4. The information storage medium on which is stored the interconnection program according to claim 1,
   wherein said acquisition step is executed at the same time as said placement and routing of said specific interconnect.

5. The information storage medium on which is stored the interconnection program according to claim 1, further causing said computer to execute:
   a modification step including modifying a layout of an interconnect group including said specific interconnect, if a result of said decision step is negative.

6. The information storage medium on which is stored the interconnection program according to claim 5,
   wherein said modification step includes modifying another interconnect other than said specific interconnect in said interconnect group, thereby decreasing said data rate without modifying said specific interconnect.

7. The information storage medium on which is stored the interconnection program according to claim 6,
   wherein said modification step includes modifying a position of said another interconnect so as to expand an interval between said another interconnect and said specific interconnect.

8. The information storage medium on which is stored the interconnection program according to claim 6,
   wherein said modification step includes deleting a part or the whole of a dummy interconnect in said another interconnect.

9. The information storage medium on which is stored the interconnection program according to claim 1,
   wherein said decision step includes deciding whether said temperature increase is within a permissible range depending on whether the following equation is satisfied:

$I < w \times \{A \times \Delta T \times (1/D.R. - 1)\}^{1/2}$ ($A$: a constant)

wherein I represents an amount of current running through said specific interconnect; w represents a width of said specific interconnect; $\Delta T$ represents an upper limit of said permissible range of said temperature increase of said specific interconnect; and D.R. represents said data rate.

10. The information storage medium on which is stored the interconnection program according to claim 1, further causing said computer to execute:
    disposing step including disposing a plurality of dummy interconnects such that said dummy interconnects are mutually connected via a conductor.

11. An interconnection method using a computer, comprising:
    acquiring by using a computer a current density and a data rate of a region that a specific interconnect passes through; and
    deciding, based on a relationship between a temperature increase of said specific interconnect, and said current density and said data rate, whether said temperature increase corresponding to said current density and said data rate acquired through said acquisition step is within a permissible range.

12. An interconnection apparatus comprising:
    an acquisition unit that acquires a current density and a data rate of a region that a specific interconnect passes through; and
    a decision unit that decides, based on a relationship between a temperature increase of said specific interconnect, and said current density and said data rate, whether said temperature increase corresponding to said current density and said data rate acquired by said acquisition unit is within a permissible range.

* * * * *